(12) United States Patent
Kawecki et al.

(10) Patent No.: US 12,553,488 B2
(45) Date of Patent: Feb. 17, 2026

(54) DYNAMIC ENERGY ABSORBING SEAT

(71) Applicant: Joby Aero, Inc., Santa Cruz, CA (US)

(72) Inventors: Jacek Kawecki, San Francisco, CA (US); Ian Andreas Villa, San Francisco, CA (US); Philipp Haban, Pittsburgh, PA (US)

(73) Assignee: Joby Aero, Inc., Santa Cruz, CA (US)

( * ) Notice: Subject to any disclaimer, the term of this patent is extended or adjusted under 35 U.S.C. 154(b) by 356 days.

(21) Appl. No.: 18/310,735

(22) Filed: May 2, 2023

(65) Prior Publication Data
US 2023/0349438 A1 Nov. 2, 2023

Related U.S. Application Data

(63) Continuation of application No. 16/579,597, filed on Sep. 23, 2019, now Pat. No. 11,680,618.

(60) Provisional application No. 62/735,806, filed on Sep. 24, 2018.

(51) Int. Cl.
*F16F 7/08* (2006.01)
*B60N 2/42* (2006.01)
*B64D 11/06* (2006.01)
*F16F 7/112* (2006.01)
*G01G 19/44* (2006.01)

(52) U.S. Cl.
CPC ............... *F16F 7/082* (2013.01); *B60N 2/42* (2013.01); *B64D 11/06* (2013.01); *B64D 11/0619* (2014.12); *F16F 7/112* (2013.01); *G01G 19/44* (2013.01)

(58) Field of Classification Search
CPC .......... F16F 7/082; F16F 7/112; F16F 7/1017; B60N 2/42; B60N 2/5692; B64D 11/06; B64D 11/0619; G01G 19/44
See application file for complete search history.

(56) References Cited

U.S. PATENT DOCUMENTS

| 4,700,648 | A | 10/1987 | Trefethern et al. |
| 6,619,585 | B1 | 9/2003 | Lidak |
| 8,182,936 | B2 * | 5/2012 | Tamura ............... B60H 1/00492 429/82 |
| 8,341,780 | B2 | 1/2013 | Arthur |
| 9,387,929 | B2 | 7/2016 | Gaillimore et al. |

(Continued)

FOREIGN PATENT DOCUMENTS

| RU | 2006116171 A | 12/2007 |
| RU | 2327970 C2 | 6/2008 |
| RU | 2377527 C1 | 12/2009 |

OTHER PUBLICATIONS

"U.S. Appl. No. 16/579,597, 312 Amendment filed May 1, 2023", 3 pgs.

(Continued)

*Primary Examiner* — Milton Nelson, Jr.
(74) *Attorney, Agent, or Firm* — SCHWEGMAN LUNDBERG & WOESSNER, P.A.

(57) ABSTRACT

Embodiments relate to dynamic stroking seats for vertical take-off and landing (VTOL) aircraft. Seat ballast tanks are attached to aircraft seats. The seats are sprung by a fixed or variable load energy absorption system. The weight of a user is determined and assigned to a corresponding seat of the user. Based on the weight of the user, the fluid level in the ballast tank is monitored and adjusted to achieve a target weight range.

16 Claims, 6 Drawing Sheets

(56) References Cited

U.S. PATENT DOCUMENTS

| | | | |
|---|---|---|---|
| 9,889,925 | B2 | 2/2018 | Rawdon |
| 10,084,216 | B2* | 9/2018 | Iguchi ................ H01M 10/625 |
| 10,166,889 | B1 | 1/2019 | Lou et al. |
| 11,680,618 | B2 | 6/2023 | Kawecki et al. |
| 2006/0080986 | A1* | 4/2006 | Inoue ................ B60H 1/00278 62/186 |
| 2011/0035118 | A1 | 2/2011 | Hiemenz et al. |
| 2016/0046369 | A1 | 2/2016 | Watkins |
| 2020/0096072 | A1 | 3/2020 | Kawecki et al. |
| 2020/0376989 | A1 | 12/2020 | Simecek et al. |

OTHER PUBLICATIONS

"U.S. Appl. No. 16/579,597, Examiner Interview Summary mailed Oct. 11, 2022", 2 pgs.

"U.S. Appl. No. 16/579,597, Non Final Office Action mailed Jul. 18, 2022", 6 pgs.

"U.S. Appl. No. 16/579,597, Notice of Allowance mailed Feb. 1, 2023", 8 pgs.

"U.S. Appl. No. 16/579,597, Notice of Allowance mailed Oct. 25, 2022", 7 pgs.

"U.S. Appl. No. 16/579,597, PTO Response to Rule 312 Communication mailed May 18, 2023", 2 pgs.

"U.S. Appl. No. 16/579,597, Response filed Oct. 4, 2022 to Non Final Office Action mailed Jul. 18, 2022", 9 pgs.

"U.S. Appl. No. 16/579,697, Response filed Jan. 23, 2023 to Notice of Allowance mailed Oct. 25, 2022", 8 pgs.

"Rotorcraft", Wikepedia [Online]. Retrieved from the Internet: <URL: https://en.wikipedia.org/wiki/Rotorcraft, (Accessed on Nov. 17, 2018), 6 pgs.

"Single-blade propeller", Wikipedia [Online]. Retrieved from the Internet: <URL: https://en.wikipedia.org/wiki/Single-blade_propeller, (accessed on Nov. 17, 2018), 3 pgs.

"Stop-Rotor Rotary Wing Aircraft", [Online]. Retrieved from the Internet:https://www.nrl.navy.mil/techtransfer/available-technologies/electronics/stop-rotor-rotary-wing-aircraft, (accessed on Nov. 17, 2018), 2 pgs.

Lee, Richard, et al., "Modeling and Control of Coaxial UAV with Swashplate Controlled Lower Propeller", CMU-RI-TR-16-33, (Jun. 2016), 20 pgs.

Paulos, James, et al., "Cyclic Blade Pitch Control Without a Swashplate for Small Helicopters", Journal of Guidance, Control and Dynamics, (2017), 35 pgs.

Paulos, James, et al., "Emulating a Fully Actuated Aerial Vehicle using Two Actuators", ICRA 2018, (2018), 6 pgs.

Paulos, James, et al., "Flight Performance of a Swashplateless Micro Air Vehicle", ICRA 2015, (2015), 6 pgs.

Paulos, James, et al., "Scalability of Cyclic Control without Blade Pitch Actuators", SciTech 2018, (2018), 18 pgs.

Uber, "Fast-Forwarding to a Future of On-Demand Urban Air Transportation Introduction", Uber Elevate, <URL:https://www.uber.com/elevate.pdf> [retrieved on Nov. 26, 2018], (Oct. 27, 2016), 98 pgs.

Williams, Robert M, "Application of Circulation Control Rotor Technology to a Stopped Rotor Aircraft Design", David W Taylor Naval Ship Research and Development Center ADA029168, (Dec. 1975), 34 pgs.

\* cited by examiner

DYNAMIC ENERGY ABSORBING SEAT

CROSS-REFERENCE TO RELATED APPLICATION

This application is a continuation of U.S. patent application Ser. No. 16/579,597, filed Sep. 23, 2019, which claims the benefit or priority to U.S. Provisional Application Ser. No. 62/735,806, filed Sep. 24, 2018, each of which are incorporated by reference herein in their entirety.

TECHNICAL FIELD

The subject matter described generally relates to vehicle seating, and in particular to a dynamic energy absorbing seat that uses ballast to adjust the seat's stroke based on occupant weight.

BACKGROUND

There is generally a wide variety of modes of transport available within cities. People can walk, ride a bike, drive a car, take public transit, use a ride sharing service, and the like. However, as population densities and demand for land increase, many cities are increasingly experiencing problems with traffic congestion and the associated pollution. Consequently, there is a need to expand the available modes of transport in ways that can reduce the amount of traffic without requiring the use of large amounts of land.

Air travel within cities has been limited compared to ground travel. Air travel can have a number of requirements making intra-city air travel difficult. For instance, aircraft can require significant resources such as fuel and infrastructure (e.g., runways), produce significant noise, and require significant time for boarding and alighting, each presenting technical challenges for achieving larger volume of air travel within cities or between neighboring cities. However, providing such air travel can reduce travel time over purely ground-based approaches as well as alleviate problems associated with traffic congestion.

Vertical take-off and landing (VTOL) aircraft provide opportunities to incorporate aerial transportation into transport networks for cities and metropolitan areas. VTOL aircraft require much less space to take-off and land relative to traditional aircraft. In addition, developments in battery technology have made electric VTOL aircraft technically and commercially viable. Electric VTOL aircraft can be quieter than aircraft using other power sources, which further increases their viability for use in built-up areas where noise can be a concern.

Stroked seats, seats with energy absorbing or plastically deforming structure are often used in rotorcraft. Existing crashworthy seats have a limited range of occupant weights that are effectively protected from spinal injury due to the physical limits of energy absorbers resulting in limited stroking, crush structure, and force absorption ranges.

SUMMARY

Embodiments relate to dynamic stroking seats for vertical take-off and landing (VTOL) aircraft. Seat ballast tanks are attached to aircraft seats. The seats are sprung by a fixed or variable load energy absorption system. The weight of a user is determined and assigned to a corresponding seat of the user. Based on the weight of the user, the fluid level in the ballast tank is monitored and adjusted to achieve a target weight range. If the seat has a variable energy absorber, the variable attenuator can be adjusted based on occupant weight. User comfort can also be increased by allowing circulation of fluid in the seat. The amount of fluid in the seat can additionally or alternatively be used as ballast to trim the aircraft.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Dynamic energy absorbing seating can be used as part of the emergency soft landing safety system of a vehicle, such as a VTOL aircraft. Stroked seats can use a suspension mechanism to decrease the load on a user's spine upon impact. Energy absorbing seats can have a limited weight range for user operation and lighter passengers can risk injury in seats not suitable to their weight. Generally, the operating range of current energy absorbing seats is restricted to a user weight of 110-220 pounds. Described herein are various embodiments of a dynamic energy absorbing seat that can provide various advantages, including improved safety.

Dynamic energy absorbing seats can be designed to be user friendly and well suited for commercial purposes. Dynamic energy absorbing seats can operate without significant burden to the user. Dynamic energy absorbing seats can provide the possibility of decreasing the minimum weight of a user or increasing the maximum weight of a user. The seats can also increase occupant comfort by cycling ballast liquid through seat backrest or seat bottom to provide heating or cooling of the seat backrest or seat bottom. If a seat is not occupied during flight, the seat can be used as ballast to trim the aircraft.

Figure 1A:
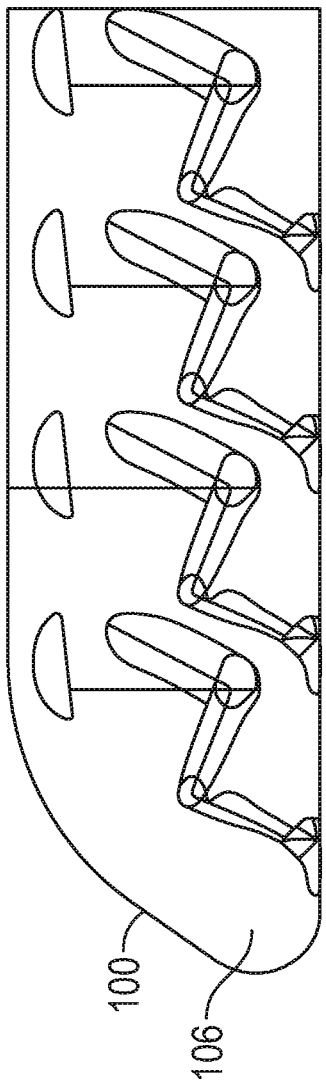
FIGS. 1A, 1B, and 1C are schematic diagrams of user occupancy of seats in a VTOL aircraft according to embodiments disclosed herein.
Figure 1C:
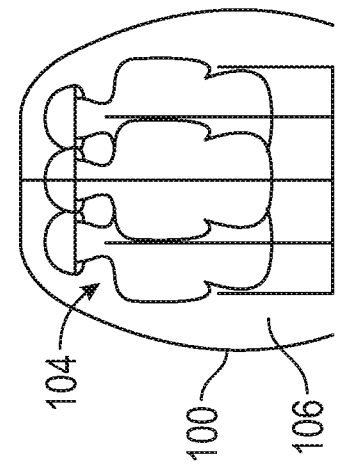
Figure 1B:
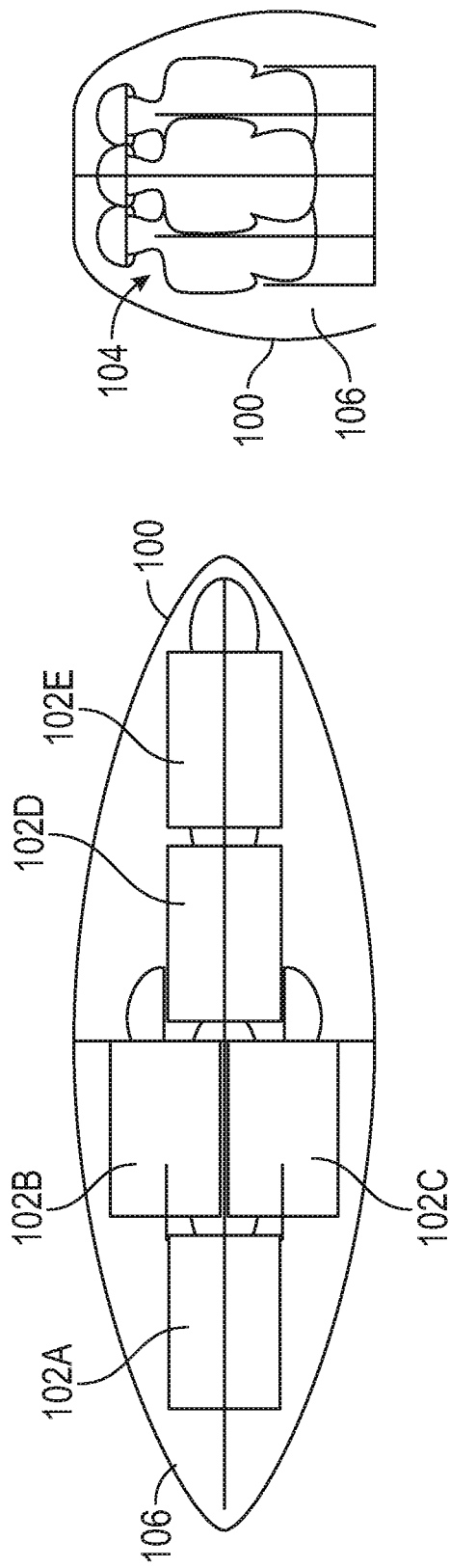

FIGS. 1A, 1B, and 1C are schematic diagrams of an aircraft 100. The aircraft 100 can include seats 102 (individually identified as 102A, 102B, 102O, 102D, and 102E). The seats 102 can be dynamic energy absorbing seats. The side view (FIG. 1A), the top view (FIG. 1B), and rear view (FIG. 1C) show possible orientations of passengers 104 within the aircraft 100. The passengers 104 can include individuals of varying ages, genders, heights, and weights. The orientation of the passengers 104 shown in FIGS. 1A-1C can vary depending upon the requirements for the aircraft 100, For example, the aircraft 100 can include more than five seats or the passengers 104 can be positioned in rows with a center aisle.

The aircraft 100 can be a battery powered VTOL aircraft. When the battery of the aircraft 100 is recharged, coolant liquid can be cycled through the aircraft 100 to prevent heating of an interior 106 heating up as well as the batteries from overheating. As the coolant is already on the aircraft, a portion of the coolant can be stored in one or more ballast tanks attached to each of seats 102 without adding to the overall payload of the aircraft 100. Still consistent with examples disclosed herein, the ballast tanks can utilize a fluid other than coolant. For example, the fluid in the ballast tanks can be fire suppressant. In the event of an onboard fire, the fluid can be used to extinguish the fire and protect the passengers 104 from burns and smoke inhalation.

Consistent with examples disclosed herein, the amount of fluid in the one or more ballast tanks can be adjusted based on the weight of the seat occupant. The total weight of the fluid and seat occupant can be monitored to achieve and maintain a weight within a threshold that enables the seats 102 to provide satisfactory protection in the event of an impact or other hard landing.

Figure 2A:
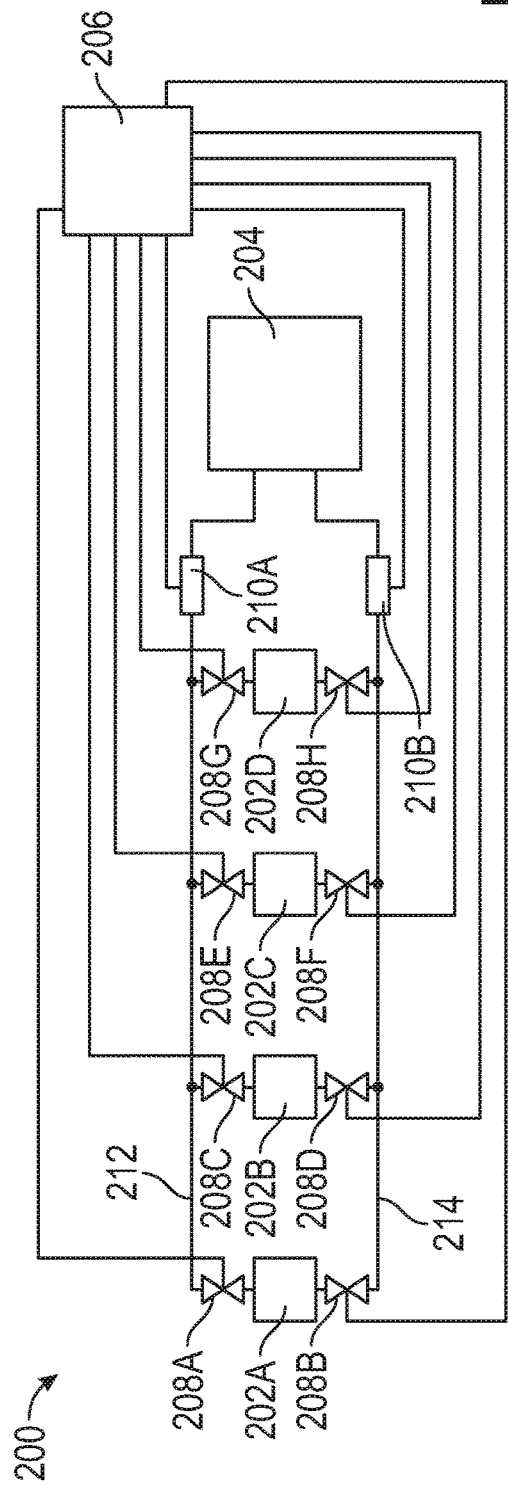
FIGS. 2A and 2B are schematic diagrams of plumbing system a dynamic energy absorbing seat system according to embodiments disclosed herein.

FIG. 2A illustrates a schematic diagram of a series plumbing system 200 for a plurality of seats 202 ((individually identified as 202A, 202B, 202C, and 202D) according to embodiments disclosed herein. As shown in FIG. 2A, system 200 can include a reservoir 204 and a controller 206. The controller 206 can be electrically coupled to valves 208 (individually identified as 208A, 208B, etc.) and pumps 210A and 210B (collectively pumps 210).

Each of the seats 202 can include a ballast tank as disclosed herein. During operation, the controller 206 can transmit activations signals to pumps 210 and valves 208 to add or remove ballast fluid from the ballast tanks of individual seats 202. For example, each of seats 202 can include two valves as shown in FIG. 2A. One of the valves can allow ballast fluid traveling from the reservoir 204 through a supply trunk line 212 to flow into the ballast tank. The other valve can allow ballast fluid to flow from the ballast tank back to the reservoir 204 via a return trunk line 214. For instance, to add ballast fluid to the ballast tank of seat 202A, valve 208A can be opened by the controller 206 when the pump 210A is activated to allow the ballast fluid to flow from the reservoir 204 through supply trunk line 212 and into the ballast tank of seat 202A. To remove fluid from a ballast tank associate with seat 202B, valve 208D can be opened to allow the ballast fluid to flow into the return trunk line 214 and back to the reservoir 204.

As shown, any combination of the valves 208 can be opened and closed to circulate ballast fluid to the seats 202. As disclosed herein, the pump 210 can be operated in a continuous manner and the valves 208 can be opened and closed incrementally to allow the ballast fluid to flow continuously into and out of the ballast tanks associated with each of the seats 202. As a result, the ballast fluid, which can be a coolant, can flow to the seats 202 and cool the seats 202 for passenger comfort.

Figure 2B:
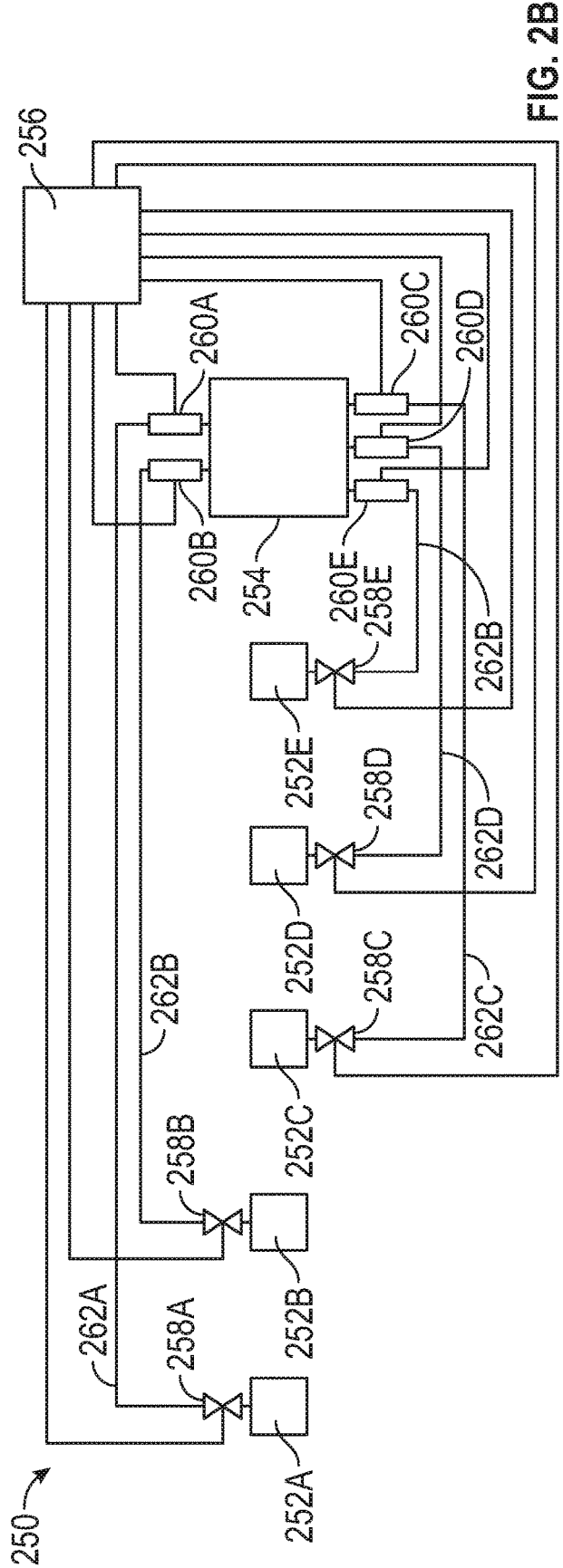

FIG. 2B illustrates a schematic diagram of a parallel plumbing system 250 for a plurality of seats 252 ((individually identified as 252A, 252B, 252C, 252D, and 252E) according to embodiments disclosed herein. As shown in FIG. 2B, system 250 can include a reservoir 254 and a controller 256. The controller 256 can be electrically coupled to valves 258 (individually identified as 258A, 258B, etc.) and pumps 260 (individually identified as 260A, 260B, etc.

Each of the seats 252 can include a ballast tank as disclosed herein. During operation, the controller 256 can transmit activations signals to pumps 260 and valves 258 to add or remove ballast fluid from the ballast tanks of individual seats 252. For example, each of seats 252 can include a valve as shown in FIG. 2B. The valves can allow ballast fluid traveling from the reservoir 254 through a supply line to flow into the ballast tank. The valves can also allow the ballast fluid to travel from the ballast tank back to the reservoir 254. For instance, to add ballast fluid to the ballast tank of seat 252A, valve 258A can be opened by the controller 256 when the pump 260A is activated to allow the ballast fluid to flow from the reservoir 264 through a supply line 262A and into the ballast tank of seat 252A. To remove fluid from the ballast tank associate with seat 252A, valve 258A can be opened while pump 260A is operated in reverse to allow the ballast fluid to flow into back to the reservoir 254 via supply line 262A. As shown in FIG. 2B, each of the seats 252 can have individual supply lines 262 (individually identified as 262A, 262B, etc.)

While FIG. 2B shows a single supply line going to each of seats 252, a return line can also be included and the return line can include a valve as disclosed with respect to FIG. 2A. The return line can allow ballast fluid to be circulated through the seats 252 to cool the seats 252 for passenger comfort.

While FIGS. 2A and 2B show a single reservoir, embodiments can include multiple reservoirs. For example, a first reservoir may be located proximate the front of the aircraft, a second reservoir may be located proximate the midsection of the aircraft, and a third reservoir mat by located proximate the rear of the aircraft. Having multiple reservoirs can allow for ballast fluid to be transferred between reservoirs to balance the aircraft. Still consistent with embodiments disclosed herein, a reservoir can be divided into multiple compartments. For example, the reservoir may be positioned under the floor of the passenger compartment and may have two or more compartments. The ballast fluid can be transferred between the compartments for weight and balance reasons.

Figure 3:
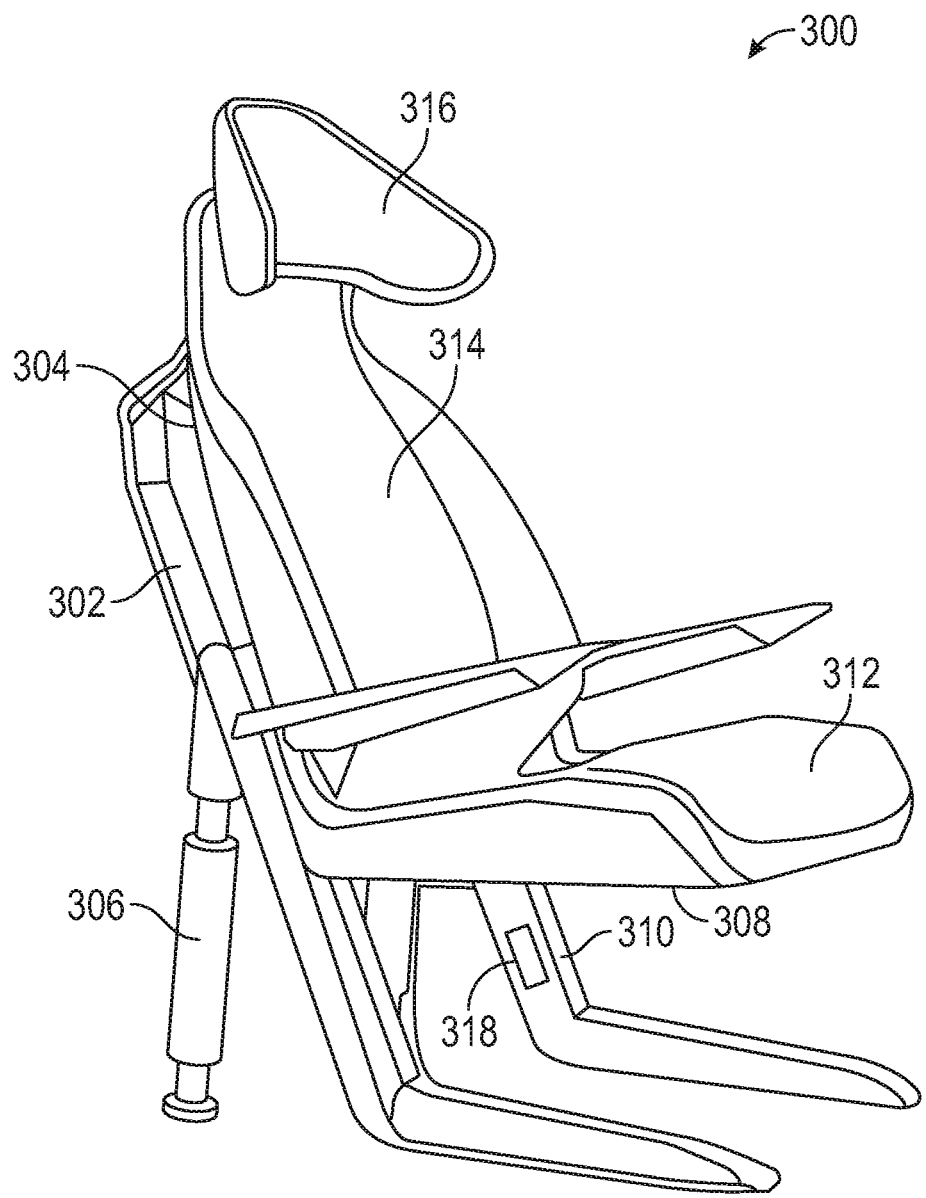
FIG. 3 illustrates a dynamic energy absorbing seat with a fluid ballast tank according to embodiments disclosed herein.

FIG. 3 illustrates a dynamic energy absorbing seat 300 according to an embodiment. The seat 300 includes a ballast tank 302 coupled to a back 304 of the seat 300 and an attenuator 306. The attenuator 306 can be used as a fixed or variable load energy absorption mechanism to reduce the load on passengers upon landing. Consistent with embodiments disclosed herein, the attenuator 306 can be replaced with a different system that performs a similar function. The elements shown by FIG. 3 can vary depending upon the embodiment and requirements of an aircraft. For example, the ballast tank 302 can be attached to a bottom 308 of the seat 300 if storage space is needed behind the seat 300. For example, the seat 300 can include a frame 310 that can include the back 304 and the bottom 308. Seat cushions 312 and 314 as well as a headrest 316 can be attached to the frame 310. Similarly, multiple ballast tanks 302 can be included on the seat 300. For example, a ballast tank can be attached to the back 304 and the bottom 308 of the seat 300.

The seat 300 can also include a load cell 318. The load cell 318 can be used to confirm a passenger's weight as disclosed herein. For example, when a passenger sits in the seat 300, the load cell 318 can deflect and generate a voltage or other signal. The signal can be received by a controller as disclosed herein and converted to a weight.

Figure 4:
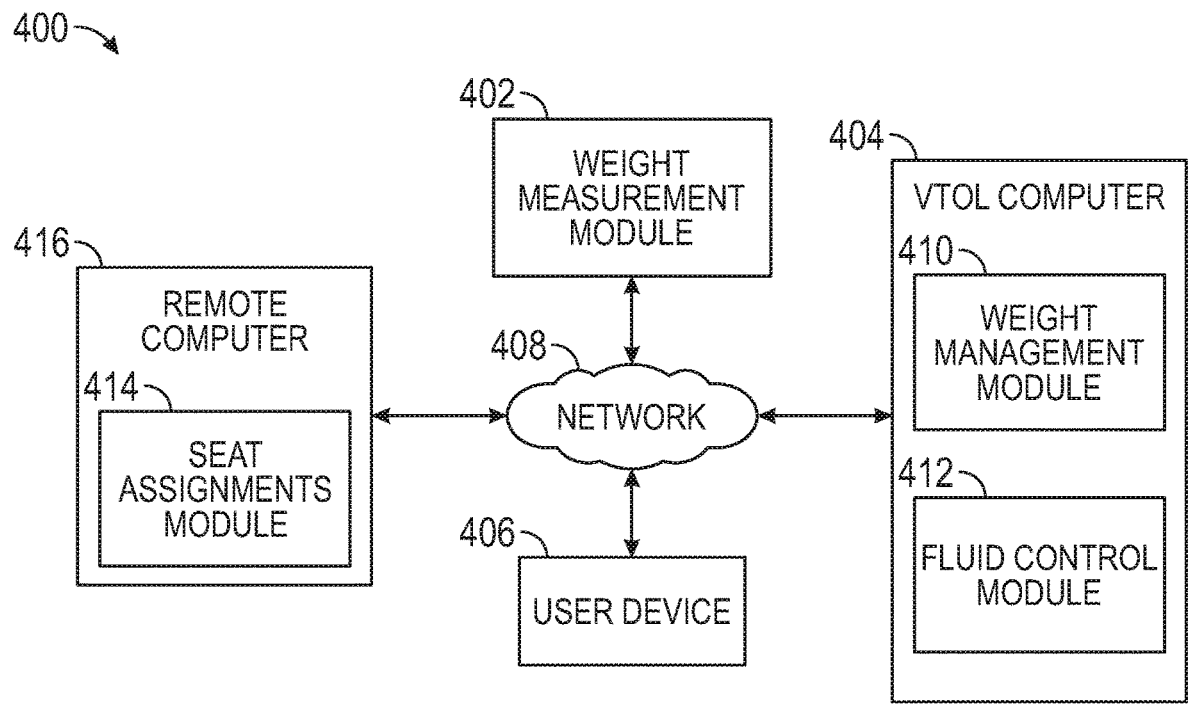
FIG. 4 illustrates a computing environment associated with a weight adjustment network according to embodiments disclosed herein.
Figure 5:
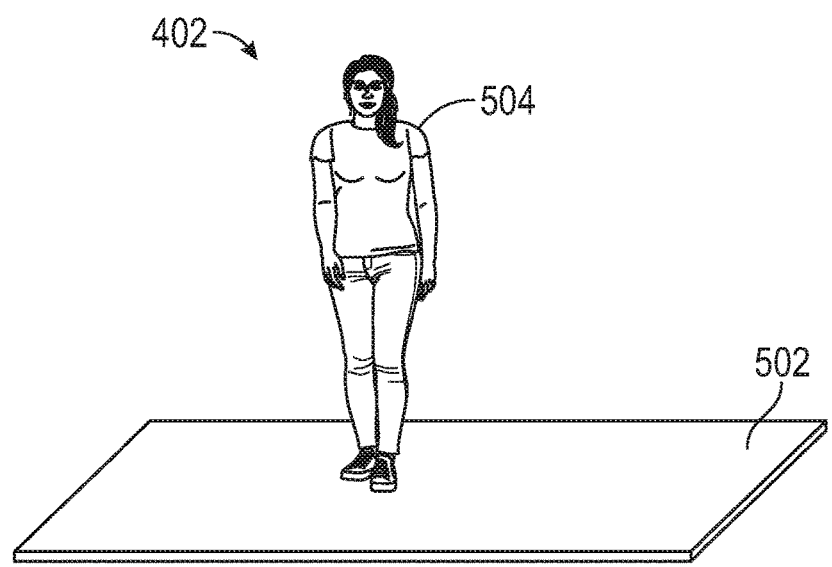
FIG. 5 is an illustration of a user being weighed on a scale as an example of a method of determining passenger weight according to embodiments disclosed herein.

FIG. 4 illustrates one embodiment of a computer-based system 400 for controlling the amount of ballast in a ballast tank, such as ballast tank 302, of a dynamic energy absorbing seat, such as seat 300. The system 400 can include a weight measurement module 402, a VTOL computer 404, and a user device 406, which can all be connected and communicate via a network 408.

Consistent with embodiments disclosed herein, the VTOL computer 404 can include a weight management module 410 and a fluid control module 412, such as controller 206 or 256. Still consistent with embodiments disclosed herein, the system 400 can include other components such as a seat assignment module 414, which may be a component of the VTOL computer 404 or a remote computing device 416 as shown in FIG. 4.

The VTOL computer 404 can be configured to communicate via the network 408 to receive and process a weight from the weight measurement module 402. The weight measurement module 402 can determine a weight of a user according to one or more embodiments described herein. The weight measurement module 402 can obtain a weight of a user and provide the weight to the VTOL computer 404 via the network 408. The weight management module 410 can determine the amount of ballast fluid to be added or removed from a ballast tank, such as ballast tank 302. The weight management module 410 can communicate with the fluid control module 412, and the fluid control module 412 can open valves, activate pumps, etc. to add or remove ballast fluid from the ballast tanks. The fluid control module 412 can control apparatuses, such as an actuator or pump, for adjusting the fluid level in a ballast tank as disclosed herein.

Still consistent with embodiments disclosed herein, the user device 406 can provide user profile information including user weight and height, luggage weight, and/or other user data. The weight measurement module 410 can receive a weight of a user via the network 350 using the user device 406. The user device 406 can also be used to assign users to a seat within an aircraft. Non-limiting examples of the user device 406 can include a cellphone, smart watch, tablet computer, etc.

A user weight can be determined once or more without departing from the embodiments disclosed herein. For example, FIG. 4 illustrates an embodiment of the weight measurement module 402. The weight measurement module 402 can include a scale 502 that a user 504 can be weighed prior to boarding an aircraft. The weight measurement module 402 can vary depending upon the embodiment. Other methods of determining the weight of the user can include receiving the weight of a user from his/her user profile described above in relation to FIG. 4, weighing the user prior to boarding the aircraft using scale 502, which can be installed in the floor of a boarding area outside the aircraft, upon boarding with scale 502 installed in the aircraft, and weighing the user in his/her seat using load cell 314.

As disclosed herein, the passenger's weight is used for safety reasons. Using the passenger's weight, the seat in which the passenger sits can be customized for safety. Upon assigning the passenger a seat, the passenger's weight can be deleted from the weight measurement module 402, the remote computer 416, or any other computing device that does not immediately need the passenger's weight. Upon completion of a flight, the passenger's weight can be deleted from the weight measurement module 402, the remote computer 416, VTOL computer 404, or any other computing device that does not immediately need the passenger's weight.

Figure 6A:
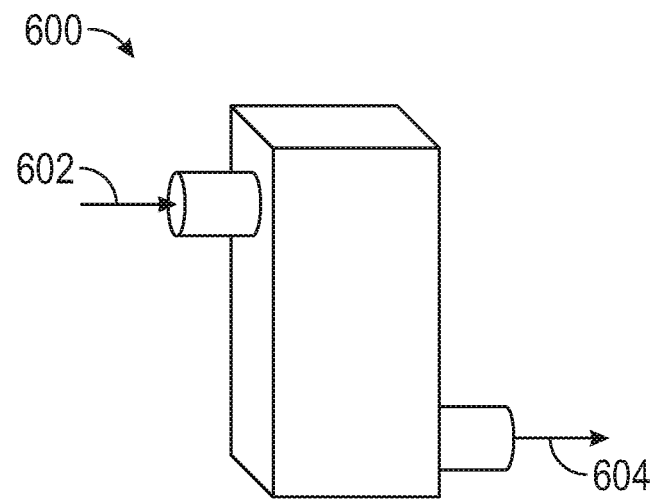
FIGS. 6A and 6B is a schematic of a seat ballast tank according to embodiments disclosed herein.
Figure 6B:
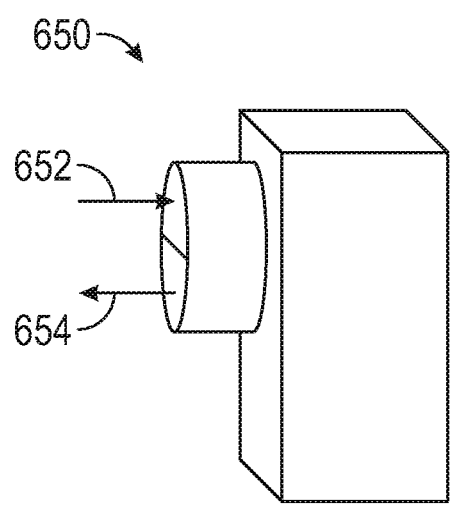

FIGS. 6A and 6B each illustrate a schematic of a ballast tank 600 and 650, such as ballast tank 302 consistent with embodiments disclosed herein. The ballast tanks 600 and 650 each can include at least one port where fluid can enter and exit. For example, as shown in FIG. 6A, the ballast tank 600 can have a fluid inlet pipe 602 and a fluid outlet pipe 604. As shown in FIG. 6B, the fluid inlet 652 and fluid outlet 654 can be contained within a single port. The orientation of a port can vary depending on the embodiment and the specifications of the aircraft. For example, as shown in FIG. 2A, ballast tank 600 can have the fluid inlet pipe 602 connected to the supply trunk line 212 and the fluid outlet pipe 604 connected to the return trunk line 214. In another example, as shown in FIG. 2B, ballast tank 650 can have the fluid inlet pipe 652 and the fluid outlet pipe 654 connected to a single supply line 262.

The ballast tanks 600 and 650 can define a cavity that allows the ballast tanks 600 and 650 to hold ballast fluid. The capacity of the ballast tanks 600 and 650 can be, for example, 8 gallons. However, the ballast tanks 600 and 650 can have other suitable volumes.

Figure 7:
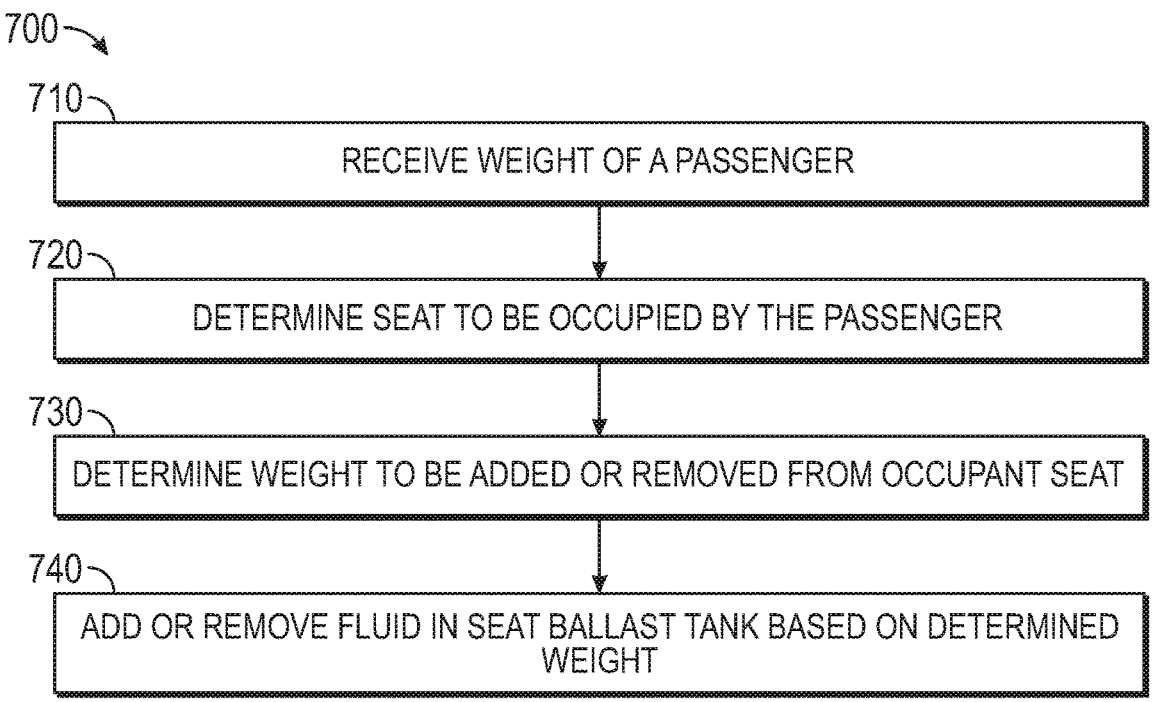
FIG. 7 is a flow chart illustrating a method for adjusting the fluid level in a seat ballast tank based on the weight of a seat occupant according to embodiments disclosed herein.

FIG. 7 is a flow chart illustrating a method 700 for adjusting the fluid level in a seat ballast tank based on the weight of a seat occupant, according to an embodiment. According to the method shown in FIG. 7, the fluid level in the seat ballast tank can be adjusted based on the weight of a user. The weight of the user can be received (710) by the system 400. The weight of the user can be determined by the weight measurement module 410.

The seat to be occupied by the user can be determined (720). The seat can be assigned before or after the user boards the aircraft and the seat assignment can be provided to the user through the user device 406. Based on the weight of the seat occupant and the target weight range of the seat 300, the amount of ballast fluid to be added or removed from the ballast tank 302 can be determined (730). For example, the density of the ballast fluid, which is known, can be divided by the amount (i.e., weight) of fluid to be added or removed from the ballast tank 302 to arrive at a volume of ballast fluid to be added or removed from the ballast tank 302. The amount of fluid added or removed can be tracked by measuring a flowrate of ballast to or from the ballast tanks. In addition, a load cell on the seats can measure the weight supported by the seats and transmit a signal to the VTOL computer 404 to indicate the amount of weight being added or removed from the seats.

The corresponding volume of fluid can be added or removed from the seat ballast tank 302 (740). For example, as disclosed herein, the VTOL computer 404 can activate pumps and valves within the aircraft to transfer ballast fluid from a reservoir to the seat ballast tanks or from the seat ballast tanks to the reservoir.

The steps of FIG. 7 are illustrated from the perspective of the VTOL, computer 404 performing the method 700. However, some or all of the steps can be performed by other entities and/or components. For example, determining the seat to be occupied by the passengers can be performed by a remote computer such as remote computing device 416. In various embodiments the stages can be performed in parallel, in different orders, or different stages can be performed.

Figure 8:
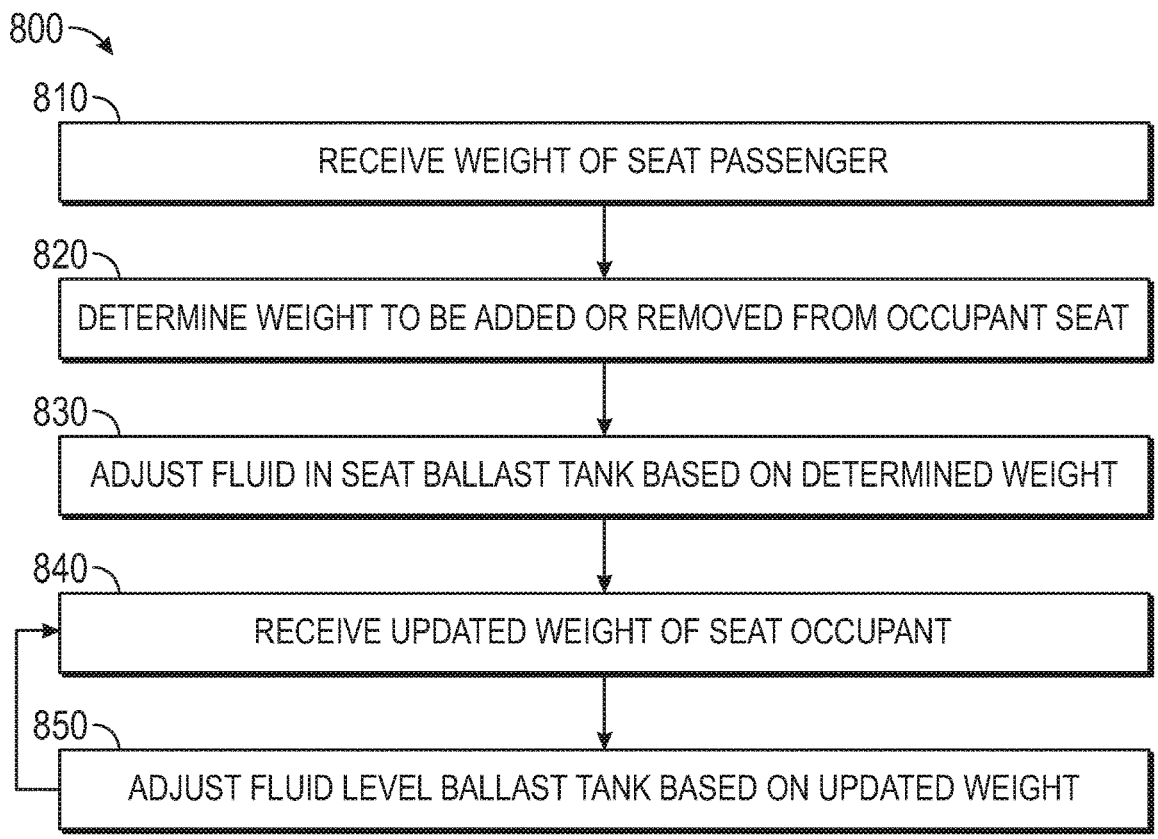
FIG. 8 is a flow chart illustrating a method for dynamically adjusting the fluid level in a seat ballast tank based on the updated weight of the seat occupant according to embodiments disclosed herein.

FIG. 8 is a flow chart illustrating a method 800 for dynamically adjusting the fluid level in a seat ballast tank based on the weight of a seat occupant according to embodiments disclosed herein. The weight of a passenger can be received (810) upon seat assignment or occupancy. For example, when a seat is assigned to a passenger, the passenger's weight can be transmitted to the VTOL computer 404.

The weight to be added or removed from the ballast tanks of the seats can be determined (820). For example, as disclosed above with respect to FIG. 7, the weight to be added or removed and the density of the ballast fluid can be used to determine a volume of ballast fluid to be added or removed.

With the weight to be added or removed, the fluid in the seat ballast tank can be adjusted (830) accordingly. For example, the pumps and valves can be actuated by the VTOL computer 404 to transfer fluid to or from the seat ballast tanks. The amount of fluid added or removed can be tracked by measuring a flowrate of ballast to or from the ballast tanks. In addition, a load cell on the seats can measure the weight supported by the seats and transmit a signal to the VTOL computer 404 to indicate the amount of weight being added or removed from the seats.

An updated weight of the occupant can be received (850). For example, the load cell 312 attached to the seat can transmit a signal to the VTOL computer 404 to indicate an updated weight. The scale 502 can transmit a signal to the VTOL computer 404 to indicate an updated weight.

With the updated weight of the occupant, the fluid level in the ballast tank 302 can be adjusted accordingly (850). For example, the fluid can be transferred between a reservoir and the ballast tanks as disclosed herein.

In various embodiments, the ballast fluid can continually circulate during flight to increase occupant comfort. For example, the system 400 can operate as a dynamic feedback model. Temperature readings along with weight readings can continually be obtained and ballast fluid circulating continually to maintain a desired seat temperature and weight.

The temperature of the battery pack can also be monitored and the ballast fluid used to cool the batteries. For example, during charging and discharge of the batteries, the batteries may generate heat. To dissipate the heat, the ballast fluid, which can be a coolant, can be circulate around the batteries to cool the batteries. In colder climates, the heat absorbed by the ballast fluid may be circulated to the seats to warm the seats and passenger compartment prior to passengers arriving.

The stages of FIG. 8 are illustrated from the perspective of the VTOL computer 404 performing the method 800. However, some or all of the steps can be performed by other entities and/or components. For example, receiving the weight of the passenger can be performed by a remote computer such as remote computing device 416 and then transmitted to the VTOL computer 404. In various embodiments the stages can be performed in parallel, in different orders, or different stages can be performed.

ADDITIONAL NOTES & EXAMPLES

Example 1 is an energy absorbing seat comprising: a seat frame; a ballast tank coupled to the seat frame, the ballast tank defining a cavity for receiving a fluid ballast; and a controller operative to perform actions comprising: receiving a weight of a passenger assigned to the seat, and determining, based on the weight of the passenger, an amount of fluid ballast to be added or removed from the ballast tank.

In Example 2, the subject matter of Example 1 optionally includes a ballast fluid distribution system electrically coupled to the controller and fluidly connected to the ballast tank, the ballast fluid distribution system configured to adjust the fluid level in the ballast tank based on the amount of fluid to be added or removed from the ballast tank.

In Example 3, the subject matter of any one or more of Examples 1-2 optionally include wherein receiving the weight of the passenger assigned to the seat includes receiving the weight from a user device.

In Example 4, the subject matter of any one or more of Examples 1-3 optionally include wherein receiving the weight of the passenger assigned to the seat includes receiving the weight from a central computing device.

In Example 5, the subject matter of any one or more of Examples 1-4 optionally include verifying the weight of the passenger assigned to the seat.

In Example 6, the subject matter of any one or more of Examples 1-5 optionally include receiving an updated weight of the passenger; and adjusting the amount of fluid ballast in the ballast tank based on the updated weight.

In Example 7, the subject matter of any one or more of Examples 1-6 optionally include wherein the ballast tank is coupled to a seat portion of the seat frame.

In Example 8, the subject matter of any one or more of Examples 1-7 optionally include wherein the ballast tank is coupled to a back portion of the seat frame.

In Example 9, the subject matter of any one or more of Examples 1-8 optionally include wherein the fluid ballast is a fire suppressant or a coolant.

In Example 10, the subject matter of any one or more of Examples 1-9 optionally include wherein the fluid ballast is a coolant.

Example 11 is an energy absorbing seat system comprising: a plurality of seats, each of the plurality of seats including: a seat frame, and a ballast tank coupled to the seat frame, the ballast tank defining a cavity for receiving a fluid ballast; a ballast fluid distribution system fluidly connecting each of the ballast tanks to a ballast reservoir; and a controller operative to perform actions comprising: receiving a weight of a passenger assigned to each of the plurality of seats, determining, based on the weight of the passenger, an amount of fluid ballast to be added or removed from of the ballast tank associated with each of the plurality of seats, and transferring the amount of fluid ballast to be added or removed to or from the ballast reservoir from or to the ballast tank associated with each of the plurality of seats.

In Example 12, the subject matter of Example 11 optionally includes wherein receiving the weight of the passenger assigned to each of the plurality of seats includes receiving the weight of at least one passenger from a user device associated with the at least one passenger.

In Example 13, the subject matter of any one or more of Examples 11-12 optionally include wherein receiving the weight of the passenger assigned to the seat includes receiving the weight of at least one of the passengers from a central computing device.

In Example 14, the subject matter of any one or more of Examples 11-13 optionally include verifying the weight of the passenger assigned to each of the plurality of seats.

In Example 15, the subject matter of any one or more of Examples 11-14 optionally include receiving an updated weight of the passenger assigned to each of the plurality of seats; and adjusting the amount of fluid ballast in the ballast tank based on the updated weight for the passenger assigned to each of the plurality of seats.

In Example 16, the subject matter of any one or more of Examples 1-15 optionally include wherein the ballast tank for each of the plurality of seats comprises: an inlet valve fluidly coupled to the supply trunk line of the ballast fluid distribution system; and an exit valve fluidly coupled to the return trunk line of the ballast fluid distribution system.

In Example 17, the subject matter of any one or more of Examples 11-16 optionally include wherein the ballast tank for each of the plurality of seats couple to the ballast fluid distribution system in parallel.

In Example 18, the subject matter of any one or more of Examples 11-17 optionally include wherein the ballast tank for each of the plurality of seats couple to the ballast fluid distribution system in series.

Example 19 is a vertical takeoff and landing (VTOL) vehicle comprising: a plurality of seats, each of the plurality of seats including: a seat frame, a load cell coupled to the seat frame, and a ballast tank coupled to the seat frame, the ballast tank defining a cavity for receiving a fluid ballast; a ballast fluid distribution system fluidly connecting each of the ballast tanks to a ballast reservoir; a controller operative to perform actions comprising: receiving a weight of a passenger assigned to each of the plurality of seats, determining, based on the weight of the passenger, an amount of fluid ballast to be added or removed from of the ballast tank associated with each of the plurality of seats, verifying the weight of the passenger assigned to each of the plurality of seats, and transferring the amount of fluid ballast to be added or removed to or from the ballast reservoir from or to the ballast tank associated with each of the plurality of seats.

In Example 20, the subject matter of Example 19 optionally includes wherein the actions further comprise: receiving an updated weight of the passenger assigned to each of the plurality of seats from the load cell couple to the seat from of each of the plurality of seats; and adjusting the amount of fluid ballast in the ballast tank based on the updated weight for the passenger assigned to each of the plurality of seats.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features can be grouped together to streamline the disclosure. However, the claims can not set forth features disclosed herein because embodiments can include a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A cooling system comprising:
   a seat;
   a battery;
   a fluid line in fluid communication with the seat and the battery;
   a valve coupled with the seat and in fluid communication with the fluid line; and
   a controller operatively coupled with the valve and the battery, the controller configured to perform actions comprising:
   monitoring a state of the battery;
   controlling the valve to allow a flow of fluid in a first direction from the seat to the battery via the fluid line based on the state of the battery, wherein the flow of the fluid in the first direction from the seat to the battery allows for heat dissipation from the battery; and
   controlling the valve to allow the flow of fluid in a second direction opposite the first direction to the seat.

2. The cooling system of claim 1, wherein the state of the battery is one of a charging state or a discharging state.

3. The cooling system of claim 1, further comprising:
   a ballast tank coupled to the seat, the ballast tank defining a cavity for receiving the fluid;
   a reservoir in fluid communication with the ballast tank; and
   a pump operatively coupled with the reservoir and the ballast tank.

4. The cooling system of claim 3, wherein the controller is further configured to activate the pump to allow for the flow of the fluid back to the seat from the battery to dissipate heat from the battery.

5. The cooling system of claim 3, further comprising a return line in fluid communication with the valve and the reservoir.

6. The cooling system of claim 3, wherein the fluid is one of coolant or fire suppressant.

7. The cooling system of claim 3, wherein the ballast tank is coupled to a seat portion of a seat frame of the seat.

8. The cooling system of claim 3, wherein the ballast tank is coupled to a back portion of a seat frame of the seat.

9. A method for controlling a cooling system comprising a seat, a battery, a fluid line in fluid communication with the seat and the battery, a valve coupled with the seat and in fluid communication with the fluid line, and a controller operatively coupled with the valve and the battery, the method comprising:
monitoring a state of the battery;
controlling the valve to allow a flow of fluid in a first direction from the seat to the battery via the fluid line based on the state of the battery, wherein the flow of the fluid in the first direction from the seat to the battery allows for heat dissipation from the battery; and
controlling the valve to allow the flow of fluid in a second direction opposite the first direction to the seat.

10. The method of claim 9, wherein the state of the battery is one of a charging state or a discharging state.

11. The method of claim 9, wherein the cooling system further comprises:
a ballast tank coupled to the seat, the ballast tank defining a cavity for receiving the fluid;
a reservoir in fluid communication with the ballast tank; and
a pump operatively coupled with the reservoir and the ballast tank.

12. The method of claim 11, wherein the method further comprises activating the pump to allow for the flow of the fluid back to the seat from the battery to dissipate heat from the battery.

13. The method of claim 11, wherein the cooling system further comprises a return line in fluid communication with the valve and the reservoir.

14. The method of claim 11, wherein the fluid is one of coolant or fire suppressant.

15. The method of claim 11, wherein the ballast tank is coupled to a seat portion of a seat frame of the seat.

16. The method of claim 11, wherein the ballast tank is coupled to a back portion of a seat frame of the seat.

\* \* \* \* \*